United States Patent
Staaks et al.

(10) Patent No.: US 10,639,590 B2
(45) Date of Patent: May 5, 2020

(54) FILTRATION SYSTEM AND METHOD FOR CHEMICAL RINSING A FILTRATION SYSTEM

(71) Applicant: DUPONT SAFETY & CONSTRUCTION, INC., Wilmington, DE (US)

(72) Inventors: Christian Staaks, Munich (DE); Peter Berg, Utting (DE)

(73) Assignee: DUPONT SAFETY & CONSTRUCTION, INC, Wilmington, DE (US)

( * ) Notice: Subject to any disclaimer, the term of this patent is extended or adjusted under 35 U.S.C. 154(b) by 0 days.

(21) Appl. No.: 15/760,784

(22) PCT Filed: Sep. 15, 2016

(86) PCT No.: PCT/EP2016/071752
§ 371 (c)(1),
(2) Date: Mar. 16, 2018

(87) PCT Pub. No.: WO2017/046196
PCT Pub. Date: Mar. 23, 2017

(65) Prior Publication Data
US 2018/0250638 A1 Sep. 6, 2018

(30) Foreign Application Priority Data
Sep. 18, 2015 (EP) ..................................... 15185786

(51) Int. Cl.
*B01D 65/02* (2006.01)
*B01D 61/18* (2006.01)
(Continued)

(52) U.S. Cl.
CPC ............. *B01D 65/02* (2013.01); *B01D 61/18* (2013.01); *B01D 61/20* (2013.01); *C02F 1/444* (2013.01);
(Continued)

(58) Field of Classification Search
CPC ........ B01D 65/02; B01D 61/20; B01D 61/18; B01D 2321/164; B01D 2321/162;
(Continued)

(56) References Cited

U.S. PATENT DOCUMENTS 5,034,121 A * 7/1991 Budin .................... B01D 61/14
210/108
6,349,835 B1   2/2002 Saux et al.
(Continued)

FOREIGN PATENT DOCUMENTS

CN    204607741 U  *  9/2015  ................ C02F 9/02
CN    204607741 U      9/2015
(Continued)

OTHER PUBLICATIONS

International Search Report dated Jan. 4, 2017, in PCT/EP2016/071752, filed Sep. 15, 2016.
(Continued)

*Primary Examiner* — Nam X Nguyen
*Assistant Examiner* — Ekandra S. Miller-Cruz

(57) ABSTRACT

A filtration system for liquid, particularly raw water, having at least one filtration module for filtering the liquid, a first inlet pipe for feeding liquid to the filtration module, a second inlet pipe for feeding liquid to the filtration module and at least one outlet pipe for discharging filtrate from the filtration module. A cleaning branch is arranged between the first inlet pipe and the second inlet pipe, and at least one dosing feeder for adding a cleaning chemical is connected to the cleaning branch. Additionally, a method for chemically
(Continued)

rinsing such a filtration, wherein a cleaning chemical is added via a dosing feeder connected to a cleaning branch which is arranged between the first inlet pipe and the second inlet pipe.

8 Claims, 2 Drawing Sheets

(51) Int. Cl.
*B01D 61/20* (2006.01)
*C02F 1/44* (2006.01)

(52) U.S. Cl.
CPC ...... *B01D 2317/04* (2013.01); *B01D 2321/04* (2013.01); *B01D 2321/16* (2013.01); *B01D 2321/162* (2013.01); *B01D 2321/164* (2013.01); *C02F 1/44* (2013.01); *C02F 2303/16* (2013.01)

(58) Field of Classification Search
CPC ............ B01D 2321/16; B01D 2321/04; B01D 2317/04; B01D 29/904; B01D 35/22; B01D 35/30; B01D 61/02; B01D 61/025; B01D 61/08; B01D 61/10; B01D 61/14; B01D 61/00; B01D 63/02; B01D 63/06; B01D 63/08; B01D 63/10; B01D 2201/16; B01D 2201/165; B01D 2311/2692; B01D 2313/105; B01D 2313/13; B01D 65/022; B01D 65/027; B01D 65/06; B01D 63/04; B01D 2321/20; B01D 2321/168; C02F 1/444; C02F 2303/16; C02F 1/44; C02F 1/441
USPC .............. 210/321.72, 321.78, 321.79, 195.2, 210/321.69, 501, 636, 650, 652
See application file for complete search history.

(56) References Cited

U.S. PATENT DOCUMENTS

| | | | |
|---|---|---|---|
| 8,790,515 B2* | 7/2014 | Zha | B01D 63/02 210/321.69 |
| 2008/0179244 A1* | 7/2008 | Morgan | B01D 65/02 210/636 |
| 2010/0051544 A1 | 3/2010 | Berg et al. | |

FOREIGN PATENT DOCUMENTS

| | | | | |
|---|---|---|---|---|
| DE | 295 07 367 U1 | 2/1996 | | |
| DE | 197 18 028 C1 | 6/1998 | | |
| DE | 101 64 555 A1 | 6/2003 | | |
| DE | 10 2005 032 286 A1 | 1/2007 | | |
| EP | 0 937 492 A2 | 8/1999 | | |
| EP | 1885475 A1 * | 2/2008 | ............ | B01D 61/22 |
| EP | 2 008 704 A1 | 12/2008 | | |
| FR | 2 973 718 A1 | 10/2012 | | |
| JP | 2001-321642 A | 11/2001 | | |
| WO | 01/23076 A1 | 4/2001 | | |
| WO | 03/013706 A1 | 2/2003 | | |
| WO | 2006/012920 A1 | 2/2006 | | |
| WO | 2006/047814 A1 | 5/2006 | | |

OTHER PUBLICATIONS

International Preliminary Report on Patentability dated Dec. 14, 2017, in PCT/EP2016/071752, filed Sep. 15, 2016.

U.S. Pat. No. 10,040,705, Aug. 7, 2018, 2017/0001884, Panglisch et al.

U.S. Appl. No. 15/116,563, filed Dec. 1, 2016, 2016/0346739, Panglisch et al.

* cited by examiner

FILTRATION SYSTEM AND METHOD FOR CHEMICAL RINSING A FILTRATION SYSTEM

The invention relates to a filtration system for liquid, particularly raw water, comprising a filtration module for filtering the liquid, a first inlet pipe for feeding liquid to the filtration module, a second inlet pipe for feeding liquid to the filtration module and an outlet pipe for discharging filtrate from the filtration module. The invention also relates to a method for chemical rinsing a filtration system for liquid, particularly raw water.

Water treatment is one of the most vital applications of filtration processes which thus experience a strong interest not only due to global water scarcity, particularly in draught-prone and environmentally polluted areas, but also due to the continuous need for drinking water supplies and for treatment of municipal or industrial waste water. Typically, water treatment relies on a combination of different methods and technologies, which depend on the intended purpose of the cleaned water as well as on the quality and degree of the contaminated or raw water.

Conventionally, water treatment is based on treatment steps such as flocculation, sedimentation and multi-media filtration. In recent years, however, membrane technologies such as microfiltration, ultrafiltration, nanofiltration and reverse osmosis have emerged, providing more efficient and reliable filtration processes. Membrane-based processes, such as microfiltration or ultrafiltration, remove turbidity caused by suspended solids and microorganisms such as pathogens like bacteria, germs and viruses from raw water. Further, significant advantages of membrane based processes are that considerably less chemical and no temperature treatment is required.

Common membranes for filtration are either flat-shaped membranes or tubular membranes with one or more capillaries. Typically, such membranes are semi-permeable and mechanically separate permeate or filtrate and the retentate from raw water. Thus, the microfiltration and ultrafiltration membranes allow permeate, such as water, to pass and hold back suspended particles or microorganisms as retentate. In this context, vital membrane parameters are, amongst others, the selectivity, the resistance to fouling and the mechanical stability. The selectivity is mainly determined by the pore size usually specified in terms of the exclusion limit given by the nominal molecular weight cut-off (NMWC) in Dalton (Da). The NMWC is usually defined as the minimum molecular weight of a globular molecule retained by the membrane to 90%. For example in ultrafiltration, the nominal pore size lies between 50 nm and 5 nm and the NMWC lies between 5 kDa and 200 kDa. In nanofiltration, the pore size lies between 2 nm and 1 nm and the NMWC lies between 0.1 kDa and 5 kDa. Thus, while ultrafiltration already filters bacteria, viruses and macromolecules, leading to water with drinking quality, nanofiltration leads to partially demineralized water. In reverse osmosis, the nominal pore size shrinks even further, below 1 nm and the NMWC shrinks below 100 Da. Reverse osmosis is thus suitable for filtering even smaller entities, such as salts or small organic molecules. In combining the different filtration technologies, a wide variety of filtration actions can be obtained which may be adapted to a specific intended purpose.

Membranes are usually embedded within a filtration system which allows to feed the raw water and to discharge permeate as well as concentrate. For this purpose, filtration systems encompass an inlet as raw feed and outlets to discharge both permeate and concentrate. For tubular-shaped membranes, different designs of filtration systems exist.

WO 2006/012920 A1 discloses a filtration system for tubular membranes. The tubular membrane includes a number of capillaries which are embedded in a porous substrate. The liquid to be filtered flows from or to at least one long inner channel of the capillaries for transporting the liquids to be filtered or filtered liquid. The tubular membrane is disposed in a tubular housing with an inlet and outlets for discharging permeate and concentrate. In particular, permeate is discharged through an outlet opening located centrally along the long axis of the tubular housing.

EP 0 937 492 A2 discloses a capillary filtration membrane module comprising a filter housing with an inlet, an outlet and a membrane compartment. To discharge permeate, the membrane compartment further comprises discharge lamellae, which guide permeate to a centrally located discharge compartment.

DE 197 18 028 C1 discloses a filtration system including an apparatus housing with membrane modules connected parallel to each other. The filtration apparatus further comprises a back flush component which allows back flushing one of the membrane modules while the others remain in filtration operation.

WO 2001/23076 A1 is related to an apparatus for purifying feed water which is fed to bundles of hollow fiber membranes arranged within the apparatus. The feed water is introduced at the top of the apparatus into a perforated tube which leads the feed water into the membranes. Filtrate is collected at the bottom and is partially stored in a diaphragm tank that is used for backwash operation.

WO 2003/013706 A1 describes a membrane module assembly with a hollow fiber membrane that is located in a vessel. The ends of the membranes open into respective collection headers. Feeds are located on the side of the vessel applying feed to the side walls of the membrane fibers and withdrawing permeate through the fiber lumens. Filtrate is removed from the headers and waste is discharged through discharge ports located on the side of the vessel opposite the feed ports.

WO 2006/047814 A1 discloses a membrane module having a plurality of hollow fiber membranes extending between upper and lower headers. The fibers in the upper header open into a permeate collection chamber. The lower header has a plurality of aeration openings for feeding gas and/or liquid into the membrane module.

DE 10 2005 032 286 A1 discloses a filtration system including several filtration modules. Each filtration module has an inlet pipe connected to an inlet compartment for the liquid to be filtered and an outlet pipe connected to an outlet compartment for the filtrate. In filtration operation, the liquid, particularly raw water is fed through the inlet pipe to the inlet compartment. The filtrate permeates a membrane and reaches the outlet compartment, while the retentate remains within the inlet compartment. The retentate is eliminated from the inlet compartment by backwash operation. For backwash operation, pure filtrate is used.

EP 2 008 704 A1 discloses a filtration system including several filtration modules. The filtration modules are connected to an inlet pipe and to an outlet pipe. For backwash operation pressurized air is fed to the outlet pipe whereat filtrate is pressed from the outlet pipe to the filtration modules.

Therefore, it is an object of the invention to provide a filtration system for liquid that allows chemical rinsing operation of the filtration module with improved effectivity.

A further object of the invention is to provide a method for chemical rinsing a filtration system for liquid with improved effectivity.

These objects are achieved according to the present invention by a filtration system for liquid, particularly raw water. The filtration system comprises at least one filtration module for filtering the liquid, a first inlet pipe for feeding liquid to the filtration module, a second inlet pipe for feeding liquid to the filtration module and at least one outlet pipe for discharging filtrate from the filtration module.

According to the invention, a cleaning branch is arranged between the first inlet pipe and the second inlet pipe, and at least one dosing feeder for adding a cleaning chemical is connected to the cleaning branch.

According to an advantageous embodiment of the invention, the cleaning branch contains a circulation pump that is arranged in series with the at least one dosing feeder.

According to a further development of the invention, the cleaning branch contains a cleaning valve that is arranged in series with the at least one dosing feeder.

Advantageously, the cleaning branch contains at least a first dosing feeder for adding an alkaline cleaning agent and a second dosing feeder for adding an acid cleaning agent.

Preferably, the cleaning branch contains a third dosing feeder for adding a chlorine cleaning agent.

Preferably, a first concentrate valve is arranged in the first inlet pipe and a second concentrate valve is arranged in the second inlet pipe.

According to an advantageous embodiment of the invention, the cleaning branch is connected to the first inlet pipe between the filtration module and the first concentrate valve, and is connected to the second inlet pipe between the filtration module and the second concentrate valve.

Advantageously, a drain pipe is connected to the first inlet pipe and to the second inlet pipe, in particular via a collecting pipe.

The objects of the invention are further achieved by a method for chemical rinsing a filtration system for liquid, particularly raw water, whereat the filtration system comprises at least one filtration module for filtering the liquid, a first inlet pipe for feeding liquid to the filtration module, a second inlet pipe for feeding liquid to the filtration module and at least one outlet pipe for discharging filtrate from the filtration module.

According to the invention, in chemically rinsing operation, a cleaning chemical is added via a dosing feeder connected to a cleaning branch, which is arranged between the first inlet pipe and the second inlet pipe.

Advantageously, the cleaning chemical is circulated through the cleaning branch and the filtration module by means of a circulation pump that is arranged in series with the dosing feeder.

Preferably, a cleaning valve that is arranged in series with the dosing feeder is opened to enable circulation of the cleaning chemical.

According to an advantageous embodiment of the invention, an alkaline cleaning agent is added via a first dosing feeder and an acid cleaning agent is added via a second dosing feeder, such that liquid in the filtration system is adjusted to a neutral pH value.

Advantageously, a chlorine cleaning agent is added via a third dosing feeder.

According to a further development of the invention, a first concentrate valve arranged in the first inlet pipe and/or a second concentrate valve arranged in the second inlet pipe is closed before the cleaning chemical is added.

Advantageously, after chemically rinsing operation, the first concentrate valve and/or the second concentrate valve is opened, such that liquid containing a cleaning chemical is discharged through the first inlet pipe and/or through the second inlet pipe.

BRIEF DESCRIPTION OF THE DRAWINGS

For a better understanding of the afore-mentioned embodiments of the invention as well as additional embodiments thereof, reference is made to the description of embodiments below in conjunction with the appended drawings showing FIG. 1 a schematically given single filtration module of a filtration system with connections to further elements of the filtration system and FIG. 2 a schematically given filtration system with a plurality of filtration modules.

Hereinafter, preferred embodiments of the present invention will be described as reference to the drawings. The drawings only provide schematic views of the invention. Like reference numerals refer to corresponding parts, elements or components throughout the figures unless indicated otherwise.

DESCRIPTION OF EMBODIMENTS

Figure 1:
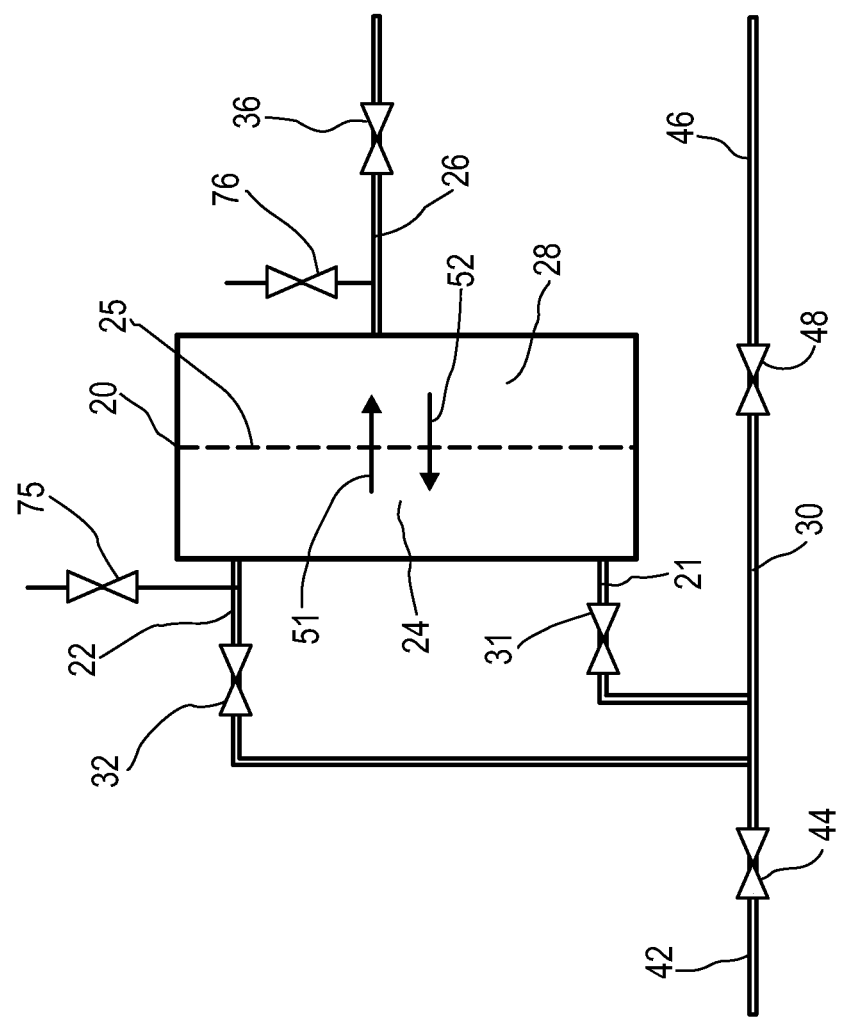

In FIG. 1, a filtration module 20 for a liquid, particularly for raw water, is shown schematically with connections to further elements. The filtration module 20 comprises a filtration membrane 25, which separates an inlet compartment 24 from an outlet compartment 28 of the filtration module 20. A first inlet pipe 21 and a second inlet pipe 22 are connected to the inlet compartment 24 of the filtration module 20. An outlet pipe 26 is connected to the outlet compartment 28 of the filtration module 20.

In filtration operation, liquid is pressed through the first inlet pipe 21 or through the second inlet pipe 22 into the inlet compartment 24 of the filtration module 20. The liquid contains water and impurities like particles of dirt. The filtration membrane 25 of the filtration module 20 is constructed to be permeated by the water, but to retain the impurities. In the following, the water that permeates the filtration membrane 25 of the filtration module 20 is called filtrate or permeate, and the impurities that are retained by the filtration membrane 25 of the filtration module 20 are called concentrate or retentate.

In filtration operation, the filtrate which has permeated the filtration membrane 25 of the filtration module 20 is pressed through the outlet pipe 26 out of the outlet compartment 28 of the filtration module 20. Hence, in filtration operation, the filtrate is flowing into a first flow direction 51, as shown by an arrow in FIG. 1, from the inlet compartment 24 through the filtration membrane 25 to the outlet compartment 28 of the filtration module 20. Then, the filtrate flows further into the outlet pipe 26.

A first concentrate valve 31 is arranged in the first inlet pipe 21, and a second concentrate valve 32 is arranged in the second inlet pipe 22. The first inlet pipe 21 and the second inlet pipe 22 are connected to a collecting pipe 30. The collecting pipe 30 is connected to a feed pipe 42, in which a feed valve 44 is arranged.

When the feed valve 44 is open and one of the concentrate valves 31, 32 is open, liquid can pass through the feed pipe 42 and one of the inlet pipes 21, 22 into the inlet compartment 24 of the filtration module 20. The feed valve 44 and the concentrate valves 31, 32 are operated automatically, in particular electrically, pneumatically or hydraulically.

An outlet valve 36 is arranged in the outlet pipe 26. When the outlet valve 36 is open, the filtrate can pass through the outlet pipe 26 and the outlet valve 36 out of the outlet compartment 28 of the filtration module 20. When the outlet valve 36 is closed, the filtrate cannot pass through the outlet pipe 26 and the outlet valve 36 out of the outlet compartment 28 of the filtration module 20. The outlet valve 36 is operated automatically, in particular electrically, pneumatically or hydraulically.

The second inlet pipe 22 is connected to an inlet aeration valve 75. By opening the inlet aeration valve 75, the inlet pipe 22 can be deaerated. The outlet pipe 26 is connected to an outlet aeration valve 76. By opening the outlet aeration valve 76, the outlet pipe 26 can be deaerated.

A drain pipe 46 is connected to the collecting pipe 30. In backwash operation, filtrate is pressed from the outlet pipe 26 back into the outlet compartment 28 of the filtration module 20. The filtrate then permeates the filtration membrane 25 in a second flow direction 52 and enters the inlet compartment 24. The second flow direction 52 which is shown by an arrow in FIG. 1 is contrariwise to the first flow direction 51. Then, the filtrate, the liquid and the retentate are pressed out of the inlet compartment 24 of the filtration module 20 through the inlet pipes 21, 22 to the collecting pipe 30 and to the drain pipe 46.

A drain valve 48 is arranged in the drain pipe 46. When the drain valve 48 is open, the liquid and the retentate can pass through the drain pipe 46 and the drain valve 48 out of the inlet compartment 24 of the filtration module 20. When the drain valve 48 is closed, the liquid and the retentate cannot pass through the drain pipe 46 and the drain valve 48 out of the inlet compartment 24 of the filtration module 20. The drain valve 48 is operated automatically, in particular electrically, pneumatically or hydraulically.

Figure 2:
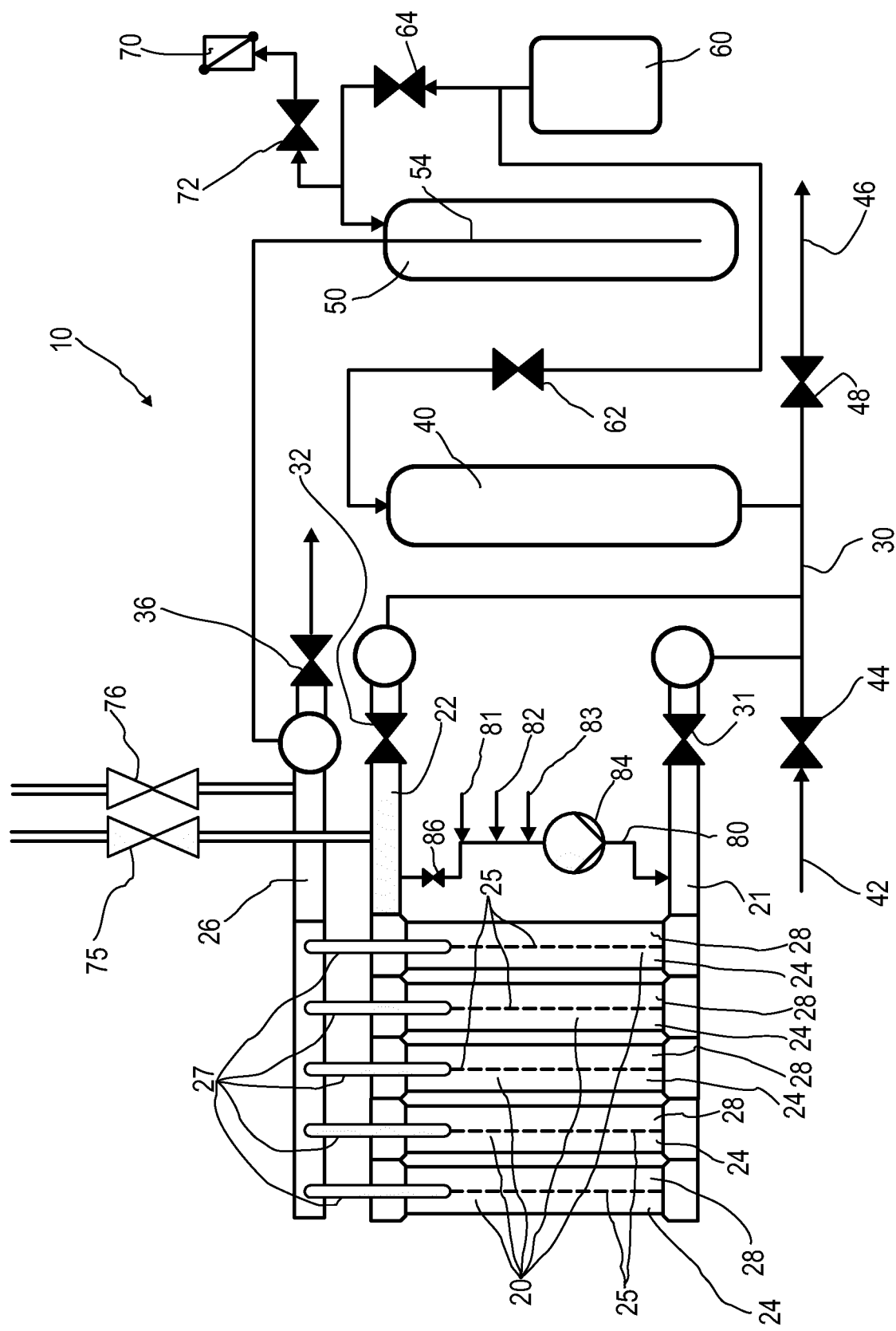

In FIG. 2, a filtration system 10 for a liquid, particularly for raw water, is shown schematically. The filtration system 10 comprises several filtration modules 20 that are connected to other elements as shown in FIG. 1. The filtration modules 20 are arranged in parallel. A first inlet pipe 21 is connected to the inlet compartments 24 of the filtration modules 20 via adaption members that are not shown here in FIG. 2. A second inlet pipe 22 is also connected to the inlet compartments 24 of the filtration modules 20 via adaption members that are not shown here in FIG. 2. An outlet pipe 26 is connected to the outlet compartments 28 of the filtration modules 20 via outlet adaption members 27.

An expansion tank 40 is connected to the collecting pipe 30. In filtration operation, the expansion tank 40 contains air at pressure which is marginally greater than ambient pressure, for example 1.5 bar. The expansion tank 40 is connected to a pressurized air device 60 via an expansion valve 62. When the expansion valve 62 is open, the pressurized air device 60 can supply pressurized air to the expansion tank 40. The pressurized air device 60 contains air at relatively high pressure, for example 6.0 bar. The pressurized air device 60 is presently a tank, but could also be a pump. The expansion valve 62 is operated automatically, in particular electrically, pneumatically or hydraulically.

A backwash tank 50 is connected to the outlet pipe 26 in an area between the outlet valve 36 and the outlet adaption members 27 of the filtration modules 20. An intake tube 54 extends from a top area into the backwash tank 50 almost until a bottom area. In filtration operation, the backwash tank 50 contains filtrate and air at ambient pressure, whereat the intake tube 54 extends through the contained air into the filtrate.

The backwash tank 50 is connected to the pressurized air device 60 via a backwash valve 64. When the backwash valve 64 is open, then the pressurized air device 60 can supply pressurized air to the backwash tank 50. The backwash tank 50 is also connected to an aeration device 70 via a tank aeration valve 72. When the tank aeration valve 72 is open, then pressurized air that is present in the backwash tank 50 can escape through the tank aeration valve 72 and the aeration device 70. The backwash valve 64 and the tank aeration valve 72 are operated automatically, in particular electrically, pneumatically or hydraulically.

A cleaning branch 80 is arranged between the first inlet pipe 21 and the second inlet pipe 22. The cleaning branch 80 contains a circulation pump 84 and a cleaning valve 86 that are arranged in series. When the cleaning valve 86 is open, then the circulation pump 84 can pump liquid from the second inlet pipe 22 to the first inlet pipe 21. In that case, liquid is circulated through the cleaning branch 80, the first inlet pipe 21, the filtration modules 20 and the second inlet pipe 22. The cleaning valve 86 is operated automatically, in particular electrically, pneumatically or hydraulically.

Thereby, the cleaning branch 80 is connected to the first inlet pipe 21 in an area between the filtration module 20 and the first concentrate valve 31. The cleaning branch 80 is also connected to the second inlet pipe 22 in an area between the filtration module 20 and the second concentrate valve 32.

A first dosing feeder 81, a second dosing feeder 82 and a third dosing feeder 83 are connected to the cleaning branch 80. The dosing feeders 81, 82, 83 allow to add cleaning chemicals into the cleaning branch 80 for a chemically enhanced backwash operation. Presently, an alkaline cleaning agent can be added via the first dosing feeder 81, an acid cleaning agent can be added via the second dosing feeder 82, and a chlorine cleaning agent can be added via the third dosing feeder 83. When a cleaning agent is added into the cleaning branch 80, then the cleaning agent can be circulated through the cleaning branch 80, the first inlet pipe 21, the filtration modules 20 and the second inlet pipe 22 by means of the circulation pump 84, as described above.

A control unit, which is not shown here, is connected electrically to the first concentrate valve 31, the second concentrate valve 32, the outlet valve 36, the feed valve 44, the drain valve 48, the expansion valve 62, the backwash valve 64, the tank aeration valve 72 and the cleaning valve 86. By means of said control unit, said valves can be opened or closed. The circulation pump 84 and the dosing feeders 81, 82, 83 are also connected electrically to the control unit and can be started or stopped by means of said control unit.

When the filtration system 10 is in filtration operation, the feed valve 44 is open, the drain valve 48 is closed, the first concentrate valve 31 is open, the second concentrate valve 32 is closed, and the outlet valve 36 is open. Alternatively, the first concentrate valve 31 is closed, and the second concentrate valve 32 is open, or both concentrate valves 31, 32 are open. Furthermore, the cleaning valve 86 is closed, the expansion valve 62 is closed, the backwash valve 64 is closed, and the tank aeration valve 72 is closed.

In filtration operation, liquid is pressed through the feed pipe 42, the collecting pipe 30, the first inlet pipe 21 or the second inlet pipe 22 into the filtration modules 20. Filtrate is pressed out of the filtration modules 20 through the outlet adapter members 27 and the outlet pipe 26. Retentate is retained by the filtration membranes 25 of the filtration modules 20 and remains in the inlet compartments 24 of the filtration modules 20.

In filtration operation, the expansion tank 40 contains air at relatively low pressure which is marginally greater than ambient pressure, for example 1.5 bar. The backwash tank 50 contains filtrate, and eventually also air, at ambient pressure. The backwash tank 50 is designed and connected to the outlet pipe 26 such that in filtration operation, filtrate that is discharged from the filtration modules 20 flows straight through the outlet pipe 26 and bypasses the backwash tank 50.

Preparing backwash operation, initially the feed valve 44 is closed, and the outlet valve 36 is closed. Then, the first concentrate valve 31 and the second concentrate valve 32 are closed, respectively remain closed. Subsequently, the drain valve 48 is opened. The cleaning valve 86, the expansion valve 62 and the tank aeration valve 72 remain closed.

To start backwash operation, the backwash valve 64 is opened. Thus, pressurized air from the pressurized air device 60 is applied to the backwash tank 50. Thereby, pressure in the backwash tank 50, in the outlet pipe 26, in the filtration modules 20 and in the inlet pipes 21, 22 is increased.

Subsequently, the first concentrate valve 31 or the second concentrate valve 32 is opened. Thus, pressure in the first inlet pipe 21 or in the second inlet pipe 22 is decreased, and liquid and permeate contained in the filtration modules 20 are pressed abruptly out of the first inlet pipe 21 or out of the second inlet pipe 22 into the collecting pipe 30 and further into the drain pipe 46. Thus, pressure in the collecting pipe 30 is increased, and liquid is also pressed into the expansion tank 40. Filtrate is pressed from the backwash tank 50 into the outlet pipe 26, and filtrate is pressed from the outlet pipe 26 into the filtration modules 20. Within the filtration modules 20, filtrate is pressed from the outlet compartment 28 through the filtration membrane 25 into the inlet compartment 24, in second flow direction 52. Thereby, the filtration membrane 25 is cleaned.

Thereby, the amount of filtrate in the backwash tank 50 is decreased, and the charging level of filtrate in the backwash tank 50 drops. When a determined lower charging level of filtrate in the backwash tank 50 is reached, the backwash valve 64 is closed. Hence, applying of further pressurized air to the backwash tank 50 is stopped. The air remaining in the backwash tank 50 is still under pressure and therefore expands further. While expanding, the air that remains in the backwash tank 50 presses further filtrate out of the backwash tank 50, until pressure of the air in the backwash tank 50 is decreased sufficiently.

Said lower charging level of filtrate in the backwash tank 50 is determined such that when the pressurized air that remains in the backwash tank 50 expands until the pressure of said air is decreased sufficiently, no air escapes into the outlet pipe 26. Hence, air escaping out of the backwash tank 50 into the outlet pipe 26 is avoided. Thereby, filtrate contained in the backwash tank 50 is discharged almost completely into the outlet pipe 26 until the backwash tank 50 contains almost only air.

Thereby, pressure in the outlet pipe 26, in the filtration modules 20, in the inlet pipes 21, 22 and in the collecting pipe 30 is decreased smoothly. The liquid that has flown into the expansion tank 40 is discharged out of the expansion tank 40 into the collecting pipe 30 and further into the drain pipe 46. When pressure in the backwash tank 50, in the outlet pipe 26, in the filtration modules 20, in the inlet pipes 21, 22 and in the collecting pipe 30 is decreased sufficiently, and the backwash tank 50 contains almost only air, backwash operation is complete.

After backwash operation, if there is still some liquid remaining in the expansion tank 40, the expansion valve 62 is opened such that pressurized air from the pressurized air device 60 is pressed into the expansion tank 40 and liquid remaining in the expansion tank 40 is discharged in to the collecting pipe 30 and further into the drain pipe 46. Thus, the expansion tank 40 is dewatered. When the expansion tank 40 is dewatered, the expansion valve 62 is closed. Alternatively, the expansion tank 40 can be dewatered before backwash operation.

To return to filtration operation, the drain valve 48 is closed, the outlet valve 36 is opened, and the feed valve 44 is opened. Eventually, one of the concentrate valves 31, 32 is closed or both concentrate valves 31, 32 remain open. Hence, liquid is fed from the feed pipe 42 via the collecting pipe 30 and at least one of the inlet pipes 21, 22 into the filtration modules 20. Permeate is discharged from the filtration modules 20 into the outlet pipe 26.

After backwash operation, the tank aeration valve 72 is opened such that air remaining in the backwash tank 50 can escape through the aeration device 70. Filtrate is flowing from the outlet pipe 26 into the backwash tank 50 until the backwash tank 50 is filled, at least almost completely, with filtrate. Thus, the backwash tank 50 is deaerated. When the backwash tank 50 is deaerated, the tank aeration valve 72 is closed. Alternatively, the backwash tank 50 can be deaerated before backwash operation.

Preparing chemical rinsing operation, initially the feed valve 44 is closed, and the outlet valve 36 is closed. Then, the first concentrate valve 31 and the second concentrate valve 32 are closed, respectively remain closed. Subsequently, the drain valve 48 is opened. The expansion valve 62, the backwash valve 64 and the tank aeration valve 72 remain closed.

To start chemical rinsing operation, the cleaning valve 86 is opened, the circulation pump 84 is started and a dosing feeder 81, 82, 83 is opened, and the respective cleaning chemical, for instance the alkaline cleaning agent, the acid cleaning agent or the chlorine cleaning agent is added into the cleaning branch 80. Hence, the added cleaning chemical and the liquid contained in the filtration system 10 are circulated through the cleaning branch 80, the first inlet pipe 21, the filtration modules 20 and the second inlet pipe 22.

It is also possible to open the first dosing feeder 81 and the third dosing feeder 83 at the same time. Hence, the alkaline cleaning agent and the chlorine cleaning agent can be added together.

The amount of cleaning chemicals added into the filtration system 10 is measured, for example by means of sensors arranged in the filtration modules 20 or in the inlet pipes 21, 22, or by means of flow meters arranged in the dosing feeders 81, 82, 83. When a sufficient amount of cleaning chemicals is inserted into the filtration system 10, the respective dosing feeders 81, 82, 83 are closed.

By circulation, as described above, the added cleaning chemicals are cleaning the surface of the filtration membranes 25 of the filtration modules 20.

To terminate chemical rinsing operation, the circulation pump 84 is stopped and the cleaning valve 86 is closed. The first concentrate valve 31 and the second concentrate valve 32 are opened. The backwash valve 64 is opened such that pressure in the backwash tank 50 increases. Hence, liquid is pressed from the outlet pipe 26 into the filtration modules 20, and liquid with cleaning chemicals contained in the filtration modules 20 is pressed out of the filtration modules 20 through the inlet pipes 21, 22 into the collecting pipe 30 and into the drain pipe 46. Thus, liquid and the added cleaning chemical are discharged out of the filtration modules 20.

If the alkaline cleaning agent has been added by the first dosing feeder 81, or the acid cleaning agent has been added by the second dosing feeder 81, the liquid contained in the filtration modules 20 has reached a non-neutral pH value.

In this case, a different dosing feeder 81, 82 is opened before termination of chemical rinsing operation, to add a complementary cleaning chemical to the filtration system. For example, if an alkaline cleaning agent has been added via the first dosing feeder 81, an acid cleaning agent is added via the second dosing feeder 82, or vice versa. Hence, the liquid in the filtration system 10 is neutralized and adjusted to a neutral pH value.

To return to filtration operation, the backwash valve 64 is closed, the drain valve 48 is closed, the outlet valve 36 is opened, and the feed valve 44 is opened. Eventually, one of the concentrate valves 31, 32 is closed or both concentrate valves 31, 32 remain open. Hence, liquid is fed from the feed pipe 42 via the collecting pipe 30 and at least one of the inlet pipes 21, 22 into the filtration modules 20. Permeate is discharged from the filtration modules 20 into the outlet pipe 26.

The foregoing description, for purpose of explanation, has been described with reference to specific embodiments. However, the illustrative discussions above are not intended to be exhaustive or to limit the invention to the precise forms disclosed.

Many modifications and variations are possible in view of the above teachings and those encompassed by the attached claims. The embodiments were chosen and described in order to explain the principles of the invention and its practical applications, to thereby enable others skilled in the art to utilize the invention and various embodiments with various modifications as are suited to the particular use contemplated.

LIST OF REFERENCE NUMERALS

10 Filtration system
20 Filtration module
21 First inlet pipe
22 Second inlet pipe
24 Inlet compartment
25 Filtration membrane
26 Outlet pipe
27 Outlet adaption member
28 Outlet compartment
30 Collecting pipe
31 First concentrate valve
32 Second concentrate valve
36 Outlet valve
42 Feed pipe
40 Expansion tank
44 Feed valve
46 Drain pipe
48 Drain valve
50 Backwash tank
51 First flow direction
52 Second flow direction
54 Intake tube
60 Pressurized air device
62 Expansion valve
64 Backwash valve
70 Aeration device
72 Tank Aeration valve
75 Inlet Aeration valve
76 Outlet Aeration valve
76 Cleaning branch
80 First dosing feeder
81 Second dosing feeder
82 Third dosing feeder
84 Circulation pump
86 Cleaning valve

The invention claimed is:

1. A filtration system for liquid, comprising:
at least one filtration module for filtering the liquid,
a first inlet pipe for feeding liquid to the filtration module,
a second inlet pipe for feeding liquid to the filtration module and
at least one outlet pipe for discharging filtrate from the filtration module,
wherein
a first concentrate valve is arranged in the first inlet pipe,
a second concentrate valve is arranged in the second inlet pipe, and
a drain pipe, in which a drain valve is arranged, such that when the drain valve is open, the liquid and retentate can pass through the drain pipe and the drain valve out of an inlet compartment of the filtration module, is connected to the inlet pipes via a collecting pipe,
wherein
the first inlet pipe and the second inlet pipe are connected to the collecting pipe and the collecting pipe is connected to a feed pipe,
in which a feed valve is arranged, such that when the feed valve is open and one of the concentrate valves is open, liquid can pass through the feed pipe and one of the inlet pipes into the inlet compartment of the filtration module, and
a cleaning branch is arranged between the first inlet pipe and the second inlet pipe, wherein the cleaning branch is connected to the first inlet pipe in an area between the filtration module and the first concentrate valve, and wherein the cleaning branch is connected to the second inlet pipe in an area between the filtration module and the second concentrate valve, and
at least one dosing feeder for adding a cleaning chemical is connected to the cleaning branch, wherein the cleaning branch contains a circulation pump arranged in series with the at least one dosing feeder, and wherein the cleaning branch contains a cleaning valve arranged in series with the at least one dosing feeder.

2. The filtration system according to claim 1, wherein the cleaning branch contains at least a first dosing feeder for adding an alkaline cleaning agent and a second dosing feeder for adding an acid cleaning agent.

3. The filtration system according to claim 2, wherein the cleaning branch contains a third dosing feeder for adding a chlorine cleaning agent.

4. The filtration system according to claim 1, wherein the cleaning branch is connected to the first inlet pipe between the filtration module and the first concentrate valve, and is connected to the second inlet pipe between the filtration module and the second concentrate valve.

5. A method for chemical rinsing a filtration system for liquid, the method comprising:
filtering the liquid with at least one filtration module;
feeding liquid via a first inlet pipe to the filtration module;
feeding liquid via a second inlet pipe to the filtration module; and discharging filtrate via at least one outlet pipe from the filtration module, the method further comprising performing a chemical rinsing operation by adding a cleaning chemical via a dosing feeder connected to a cleaning branch which is arranged between the first inlet pipe and the second inlet pipe, opening a cleaning valve arranged in series with the dosing feeder to enable circulation of the cleaning chemical, circulating the cleaning chemical through the cleaning branch and the filtration module via a circulation pump arranged in series with the dosing feeder, and closing a first concentrate valve arranged in the first inlet pipe and a second concentrate valve arranged in the second inlet pipe before the cleaning chemical is added, and after chemically rinsing operation, opening the first concentrate valve and the second concentrate valve, such that liquid comprising a cleaning chemical is discharged through the first inlet pipe and through the second inlet pipe that are connected to a collecting pipe, wherein a drain pipe is connected to the collecting pipe, a drain valve is arranged in the drain pipe, such that when the drain valve is open, the liquid and retentate can pass through the drain pipe and the drain valve out of an inlet compartment of the filtration module, and the cleaning branch is connected to the first inlet pipe in an area between the filtration module and the first concentrate valve, and the cleaning branch is connected to the second inlet pipe in an area between the filtration module and the second concentrate valve.

6. The method according to claim 5, wherein an alkaline cleaning agent is added via a first dosing feeder and an acid cleaning agent is added via a second dosing feeder, such that liquid in the filtration system is adjusted to a neutral pH value.

7. The method according to claim 5, wherein a chlorine cleaning agent is added via a third dosing feeder.

8. The method according to claim 5, comprising preparing a chemical rinsing operation by initially closing a feed valve and closing an outlet valve arranged in the outlet pipe, wherein the feed valve is arranged a feed pipe, such that when the feed valve is open and one of the concentrate valves is open, liquid can pass through the feed pipe and one of the inlet pipes into the inlet compartment of the filtration module, wherein the collecting pipe is connected to the feed pipe.

* * * * *